No. 752,175. PATENTED FEB. 16, 1904.
A. P. MONNIER.
MUTE FOR WATER PIPES.
APPLICATION FILED MAY 4, 1903.
NO MODEL.

WITNESSES
T. J. Massey
May E. Kott

INVENTOR
Alfred P. Monnier
By Parker & Burton
Attorneys.

No. 752,175. Patented February 16, 1904.

UNITED STATES PATENT OFFICE.

ALFRED P. MONNIER, OF GREENFIELD, MICHIGAN.

MUTE FOR WATER-PIPES.

SPECIFICATION forming part of Letters Patent No. 752,175, dated February 16, 1904.

Application filed May 4, 1903. Serial No. 155,493. (No model.)

*To all whom it may concern:*

Be it known that I, ALFRED P. MONNIER, a citizen of the United States, residing at Greenfield, county of Wayne, State of Michigan, have invented a certain new and useful Improvement in Mutes for Water-Pipes; and I declare the following to be a full, clear, and exact description of the invention, such as will enable others skilled in the art to which it pertains to make and use the same, reference being had to the accompanying drawings, which form a part of this specification.

This invention relates to tank attachments, and has for its object an improved attachment to be used to prevent the noise that attends the inflow of water through a pipe into a tank.

The noise which attends the inflow of water into a storage-tank is a frequent source of annoyance and makes the use of such tanks objectionable, and I have produced a device which prevents such noise or reduces it to a very great extent. With a pressure that is not too high the device entirely overcomes the objectionable noise, and with a high pressure, exceeding one hundred and fifty pounds, or thereabout, reduces it very greatly. In fact, by changing the proportions somewhat the device will entirely overcome the noise, even at pressures far exceeding the amount mentioned.

Figure 1:
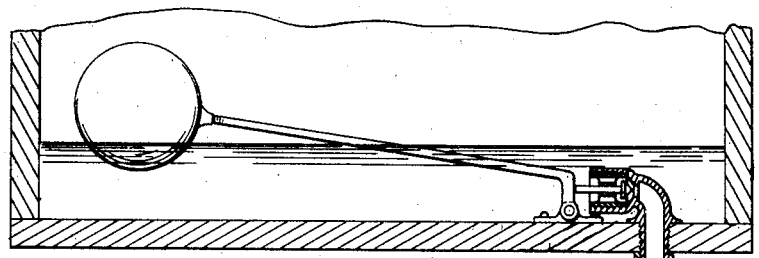
Figure 2:
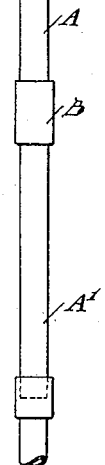
Figure 2:
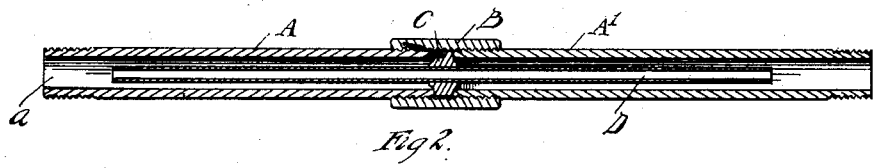

In the drawings, Figure 1 indicates the relative location of the attachment and the tank. It shows the tank in section and the attachment in elevation. Fig. 2 is a section longitudinal of the attachment.

The attachment consists, essentially, of a pipe of small diameter inserted through a diaphragm in the inlet-pipe to the tank. The upper end of the pipe, of small diameter, is below the upper end of the inlet-pipe, and there is a small chamber in the pipe at this place. The lower end of the small pipe is from ten to fifteen inches below, depending somewhat on the pressure, as the relative size of the external pipe and the internal pipe varies in a proportion that is somewhat inverse to the comparative diameters of the two for pressures below one hundred and fifty (150) pounds.

I have found that I can use to advantage the pipe commonly used for the inlet-pipe to the systems of water-closets—namely, what is known as "three-eighths iron-pipe" size, the pipe generally used being a brass pipe of approximately .0675-inch external diameter and .0494-inch internal diameter. With this pipe I have found experimentally that the small pipe to work to good advantage and probably to the best advantage should be approximately three-sixteenths of an inch external diameter, one-eighth of an inch internal diameter, about ten inches long, and with its upper end located about one and one-half to two inches below the end of the pipe which engages the nipple through the bottom of the tank. Of course I do not wish to confine myself strictly to the size mentioned, as the action will be similar, although the sizes may be varied within a considerable range.

In the drawings, A and A' indicate the external section of the pipe, made in two parts for convenience of manufacture.

B indicates a nipple uniting the two parts.

C indicates a diaphragm closing the opening of the pipe at the nipple between the adjacent ends of the two pieces of pipe. Through the diaphragm C is inserted a small pipe D, that extends along the axis of the pipe A on each side of the diaphragm C, leaving an annular chamber between the outside of the pipe D and the inside of the pipe A at each side of the diaphragm C.

The upper end of the attachment thus constructed is secured to the nipple which passes through the bottom of the tank or secured to a pipe leading into the tank and which terminates with an automatic valve of any approved form of construction. The pipe itself is used as a continuation of the ordinary inflow-pipe or as a section of the ordinary inflow-pipe.

I find that the long contracted channel through the inner pipe and the large expansion-chamber *a*, formed inside the larger pipe at the upper end of the inner pipe, are essential factors in the production of the desired result.

What I claim is—

1. In an attachment for water-tanks, in combination with a section of the inlet-pipe, a pipe inserted therein and having a bore of less diameter, means to compel the passage of all water through the pipe of small diameter, an expansion-chamber at the upper end of the attachment between the terminal of the pipe of small diameter and the end of the outer pipe, substantially as described.

2. In a mute for water-pipes, in combination with an external pipe, a smaller pipe located within the external pipe, a diaphragm closing the annular passage between the two pipes, substantially as described.

3. In a mute for water-pipes, in combination with an external pipe, a pipe of small diameter located within the external pipe, a diaphragm closing the annular passage between the two pipes, there being a chamber within the external pipe beyond the end of the small pipe and between the end of the small pipe and the end of the external pipe, substantially as described.

4. In a mute for water-pipes, in combination with the main water-pipe, a pipe of small diameter inserted therein with the axes of the two pipes coincident, a diaphragm closing the annular passage between the two pipes, and with an annular chamber on the upper side of the diaphragm between the two pipes, substantially as described.

5. In a mute for water-pipes, in combination with the main water-pipe, a pipe of small diameter inserted therein with the axes of the two pipes coincident, a diaphragm closing the annular passage between the two pipes, and with an annular chamber on the under side of the diaphragm between the two pipes, substantially as described.

6. In a mute for water-pipes, in combination with the main water-pipe, a pipe of small diameter inserted therein with the axes of the two pipes coincident, a diaphragm closing the annular passage between the two pipes, and with an annular chamber between the two pipes on each side of the diaphragm, substanially as described.

7. In a mute for water-pipes, in combination with a main pipe, a pipe of smaller diameter inserted therein and leaving a chamber within the main pipe between the end thereof and the end of the inserted pipe, and means for compelling the entire flow of water through the bore of the inserted pipe, substantially as described.

In testimony whereof I sign this specification in the presence of two witnesses.

ALFRED P. MONNIER.

Witnesses:
CHARLES F. BURTON,
MAY E. KOTT.